United States Patent
Lee et al.

(10) Patent No.: US 11,801,762 B2
(45) Date of Patent: Oct. 31, 2023

(54) MODULARIZED ELECTRICAL VEHICLE SUPPLY EQUIPMENT SYSTEM

(71) Applicant: Rivian IP Holdings, LLC, Plymouth, MI (US)

(72) Inventors: David Day Lee, Bloomfield Hills, MI (US); Trent Warnke, Novi, MI (US); Christopher Poulsen, San Francisco, CA (US); Tony Caravano, Costa Mesa, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 370 days.

(21) Appl. No.: 16/945,024

(22) Filed: Jul. 31, 2020

(65) Prior Publication Data

US 2022/0032794 A1  Feb. 3, 2022

(51) Int. Cl.
| | |
|---|---|
| *B60L 53/16* | (2019.01) |
| *H01R 33/945* | (2006.01) |
| *H01R 24/28* | (2011.01) |
| *B60L 53/66* | (2019.01) |
| *B60L 53/18* | (2019.01) |
| *H01R 105/00* | (2006.01) |

(52) U.S. Cl.
CPC ............... *B60L 53/16* (2019.02); *B60L 53/18* (2019.02); *B60L 53/66* (2019.02); *H01R 24/28* (2013.01); *H01R 33/945* (2013.01); *H01R 2105/00* (2013.01); *H01R 2201/26* (2013.01)

(58) Field of Classification Search
CPC .................................. B60L 53/16; H01R 24/28
USPC .......................................................... 320/109
See application file for complete search history.

(56) References Cited

U.S. PATENT DOCUMENTS

| | | | |
|---|---|---|---|
| 2011/0055037 A1* | 3/2011 | Hayashigawa | B60L 53/16 705/26.1 |
| 2013/0201641 A1* | 8/2013 | Soden | B60L 3/04 361/752 |
| 2015/0258902 A1* | 9/2015 | Fietzek | B60L 55/00 307/9.1 |
| 2019/0184849 A1* | 6/2019 | Lim | B60L 53/18 |
| 2022/0194236 A1* | 6/2022 | Whiting | B60L 53/16 |

\* cited by examiner

*Primary Examiner* — Suchin Parihar
(74) *Attorney, Agent, or Firm* — Clements Bernard Walker; Christopher L. Bernard

(57) ABSTRACT

Disclosed illustrative embodiments include docking stations, portable electrical vehicle supply equipment cables, and modular electrical vehicle supply equipment systems. An illustrative docking station includes a receiver configured to be physically couplable with a structure and a source electrical connector configured to be electrically couplable to a power source and the receiver. The docking station also includes an electrical connector configured to be electrically couplable with a portable electrical vehicle supply equipment cable and the receiver. The docking station further includes a communications device couplable in data communication with the receiver and configured to send and receive information relating to use of the electrical connector.

20 Claims, 2 Drawing Sheets

MODULARIZED ELECTRICAL VEHICLE SUPPLY EQUIPMENT SYSTEM

INTRODUCTION

The present disclosure relates to electrical vehicle (EV) charging hardware.

The statements in this section merely provide background information related to the present disclosure and may not constitute prior art.

With widespread use of electric vehicles comes greater need for charging resources and standardization. Electric Vehicle Supply Equipment (EVSE) is one standard used for vehicle charging equipment.

Electrical vehicle drivers wishing to have Level 2 (L2) charging (240 Volt) speeds while parking at home typically install an L2 Electrical Vehicle Supply Equipment (EVSE) station. Many drivers keep the mobile charging cable included with their vehicle in the vehicle itself. Some drivers choose to purchase additional EVSE hardware for their homes for aesthetic benefit, convenience, or higher-powered charging than their mobile cable is capable of. Also, L2 EVSE hardware is generally more reliable and is able to withstand higher use cycles than typical in-home receptacles. Many mobile cables included with the purchase of electric vehicles are capable of L2 charging speeds, which is the same as their wall-mounted home EVSE counterparts. Therefore, there is a redundancy to the way many EV drivers use their charging hardware because there are two cables, one which comes as part of the EVSE station and one which comes with the EV.

Current market offerings of EVSEs that support Level 2 charging exist in two variations: units that are optimized for portability and others that are designed for stationary uses. The first allow for travel with them to have access to vehicle charging where plug-in charging is available. Some original equipment manufacturers (OEMs) also include portable EVSEs as part of the vehicle purchase. The second category of EVSEs are used to support charging on residential and commercial settings. They provide faster charging than the portable counterparts and are also equipped with additional features such as network connection and payment transaction capabilities.

In some instances of use, only Level 1 (L1) charging may be available. Level 1: refers to the charging from a regular household 120 V outlet with a maximum current of 12 or 15 A, which delivers a maximum power of 1.44 kW or 1.92 kW. Most often in this case, the active charging element is inside the vehicle (e.g., the EV's on-board charger). Because of the differences in availability of various charging situations (e.g., L1 or L2), a vehicle operator may often carry with them two different charging cables, for example one for L1 charging and one for L2 charging.

Thus, electric vehicle drivers encounter redundant hardware when seeking to enhance versatility and improve charging speed.

SUMMARY

Disclosed illustrative embodiments include docking stations, portable electrical vehicle supply equipment cables, and modular electrical vehicle supply equipment systems.

In an illustrative embodiment, a docking station includes a receiver configured to be physically couplable with a structure and a source electrical connector configured to be electrically couplable to a power source and the receiver. The docking station also includes an electrical connector configured to be electrically couplable with a portable electrical vehicle supply equipment cable and the receiver. The docking station further includes a communications device couplable in data communication with the receiver and configured to send and receive information relating to use of the electrical connector.

In another illustrative embodiment, a portable electrical vehicle supply equipment (EVSE) cable includes a first end having a vehicle electrical connection interface and a second end terminating at an EVSE interface. The portable EVSE cable also includes a first port coupled to the EVSE interface configured to receive a power cable from an outlet and a second port coupled to the EVSE interface configured to electrically couple with a docking station.

In another illustrative embodiment, a modular electrical vehicle supply equipment (EVSE) system includes a docking station configured to be physically coupled with a structure and an electrical connector configured to be coupled with a portable EVSE cable and coupled with the docking station. The system also includes a communications device coupled with the docking station and configured to send and receive information relating to use of the electrical connector. Further, the system includes a portable EVSE cable having a first end with a vehicle connector interface and a second end couplable to the electrical connector.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
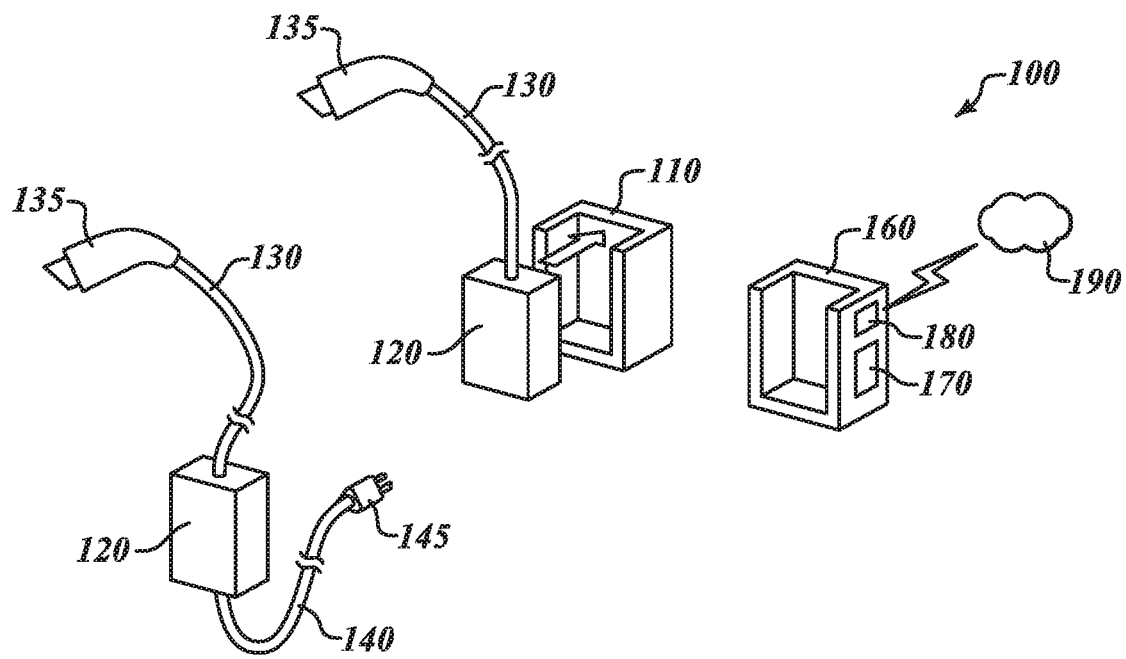
FIG. 1 is a perspective view in partial schematic form of an illustrative modular electrical vehicle supply equipment (EVSE) system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
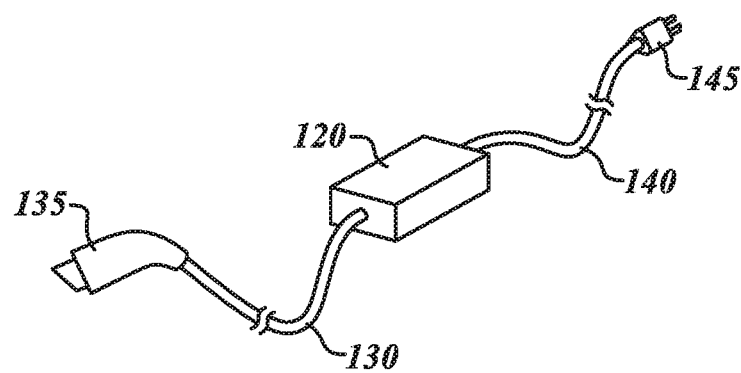
FIG. 2 is a perspective view in partial schematic form of an illustrative portable EVSE cable.

Referring now to FIGS. 1 and 2, in an illustrative embodiment a modularized EVSE system 100 combines a docking station 110 which can be affixed to the side of an EV driver's home, or any structure, while in use as home EVSE and a mobile charging cable or portable EVSE cable. The mobile charging cable or the portable EVSE cable includes an EVSE interface 120 coupled to one end of an electrical cable portion 130 and coupled to a vehicle electrical connection interface 135 at the other end of the electrical cable portion. The EVSE interface 120 includes a first port which may be configured to receive a power cable 140 having a plug connector 145 for coupling to a standard National Electrical Manufacturers Association (NEMA) outlet or another standardized receptacle. The EVSE interface 120 includes a second port that is coupled to the EVSE interface 120 and is configured to electrically couple with the docking station 110.

In accordance with an illustrative embodiment, the vehicle electrical connection interface 135 may be configured to support any of a variety of electrical interfaces including but not limited to a Level One charging interface or a Level Two charging interface. The power cable 140 may be any of a variety of cable types including, but not limited to, those that support 120V service or 240V service. The plug connector 145 may be, but is not limited to, a standardized NEMA connector, a standardized three-prong connector or any other type of electrical connector for connecting to a power receptacle. In accordance with an illustrative embodiment, the EVSE interface may include any of a variety of electrical equipment protection devices including but not limited to circuit breakers, fuses, and other switching devices.

Figure 3:
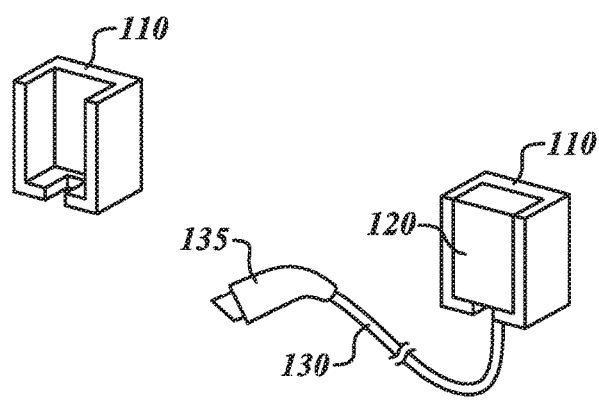
FIG. 3 is a perspective view in partial schematic form of an illustrative portable EVSE docking system.
Figure 4:
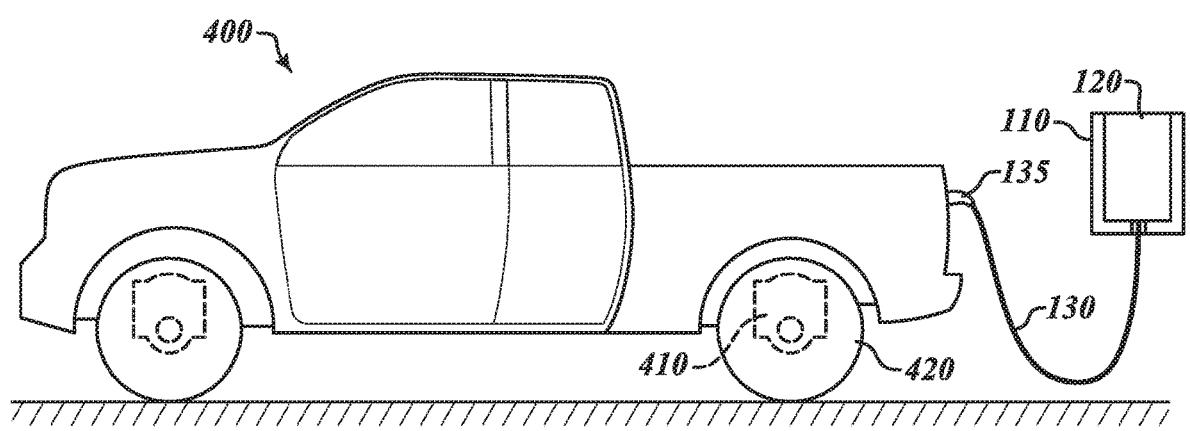
FIG. 4 is a side plan view in partial schematic form of an illustrative electric vehicle being charged.

Using the illustrative EVSE cable depicted in FIG. 1 and FIG. 2, a driver may arrive home or any location with the docking station 110. To charge the EV, the driver removes the cable portion 140 from the EVSE interface 120 and inserts the interface 120 into the docking station 110 for charging, such as depicted in FIGS. 3 and 4. Using docking station 110 versus the typical standardized NEMA plu on cable portion 140, provides substantially reduced charging times and reliability as compared to its NEMA counterpart. As depicted in the illustrative embodiment of FIG. 4, a vehicle, such as but not limited to, an electric truck 400, has at least one electrical motor 410 couplable to drive at least one wheel 420. The vehicle electrical connection interface 135 is coupled to a charging interface on the truck 400. A vehicle electrical connection interface 135 receives power through the cable 130 from the EVSE interface 120 coupled with the docking station 110. If the driver wishes to take the charging cable with the driver for mobile use, the driver can simply detach the EVSE interface 120 from the docking station 110 and take the EVSE with them in a convenient manner. It may be noted that the EVSE system 100 may be used with other vehicles not limited to electric vehicles. Other vehicles that the EVSE system 100 may be used include, but are not limited to, hybrid vehicles.

In accordance with an illustrative embodiment, the driver may also take with the driver the power cable 140 with the plug connector 145. The plug connector 145 may be, but is not limited to, a NEMA plug at the supply side to easily plug into a standard outlet such as a NEMA 14-50 50 amp outlet which can be installed at a home to enable L2 charging speeds. This same outlet is also commonly found at campgrounds for use with RVs, which makes the device a convenient tool for charging at L2 speeds while camping. The proposed device will have swappable NEMA plug connectors 145 on the supply side, which will allow use with a variety of plugs at different speeds (such as but not limited to a NEMA 5-15 which is a standard wall plug, and the aforementioned NEMA 14-50 for higher powered charging).

Providing a wall mounted docking station, such as the docking station 110, can help provide simplicity for mobile use and also home use. The portable EVSE cable allows the servicing of two use cases for charging hardware with a single device. This simplification can help contribute to providing simplified hardware for EV drivers. This simplification can also help contribute to simplified manufacturing and reduced product-line complexity for any OEM by potentially eliminating a need for wall-mounted EVSE models. Rather than selling a mobile cable and a wall mounted EVSE unit, an OEM may be able to offer one charging cable with multiple mounting and electrical attachment options instead. For example, but without limitation, drivers may have the ability to take a high-powered charger with them to a campground or other adventure destination where high-powered plugs may be available, thereby helping to provide one single L2 capable system for adventure charging as well as home charging.

Referring again to FIG. 1, the docking station 110 is depicted as receiving EVSE interface 120. In another illustrative embodiment, a docking station 160 similarly is configured to receive the EVSE interface 120 and is configured to be mounted to a wall or any other structure. The docking station 160 is electrically coupled to a power source, such as an in-home electrical system. The docking station 160 also includes a control relay module 170 which enables remote control of the docking station 160. For example, the control relay module 160 may be able to enable remote control (on/off, mode of operation, etc.) through a wireless communications device 180, such as but not limited to a Bluetooth, cellular, or Wi-Fi communications module that is capable of communicating over a wireless communication network 190. The operation of the control relay module 170 and the wireless communication device 180 enables users to control and monitor the operations of the docking station 160. In some instances, users may be able to monitor whether the docking station 160 is being used (i.e., vehicle is plugged in, state of charge, charging status, etc.) or control the docking station 160 (i.e., turn on/off, change charging modes, etc.).

In accordance with an illustrative embodiment, a modular electrical vehicle supply equipment (EVSE) system includes a docking station, such as the docking station 110 or the docking station 160, and a mobile charging cable having an EVSE interface 120 coupled to one end of the electrical cable portion 130 and coupled to the vehicle electrical connection interface 135 at the other end of the electrical cable portion. The EVSE interface 120 includes a first port that is couplable to a power cable 140 having the plug connector 145 for coupling to a standard NEMA outlet or another standardized receptacle. The EVSE interface 120 includes a second port configured for electrically coupling with the docking station 110.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A modular electrical vehicle supply equipment (EVSE) system comprising:
    a docking station configured to be physically couplable with a structure and electrically couplable to a power source of the structure;
    an electrical vehicle supply equipment (EVSE) interface configured to be electrically couplable with a portable electrical vehicle supply equipment (EVSE) cable and the docking station; and
    a communications device couplable in data communication with the docking station and configured to send and receive information relating to use of the EVSE interface;
    wherein the EVSE interface comprises a first port configured to receive a power cable from an outlet when the EVSE interface is not electrically coupled to the docking station; and
    wherein the EVSE interface further comprises a second port configured to electrically couple with the docking station when the first port is not in use receiving the power cable from the outlet and the power cable is removed from the first port.

2. The system of claim 1, wherein the docking station is configured to be physically couplable to a wall structure.

3. The system of claim 1, wherein the docking station is configured to mechanically support the EVSE interface during use.

4. The system of claim 1, wherein the docking station is configured to be hardwired to the power source of the structure.

5. The system of claim 1, wherein the docking station includes a National Electrical Manufacturers NEMA connection to the power source of the structure.

6. The system of claim 1, wherein the EVSE interface is configured to support at least Level One charging.

7. The system of claim 1, wherein the EVSE interface is configured to support at least Level Two charging.

8. A portable electrical vehicle supply equipment (EVSE) cable comprising:
    a first end having a vehicle electrical connection interface;
    a second end terminating at an electrical vehicle supply equipment (EVSE) interface;
    a first port coupled to the EVSE interface configured to receive a power cable from an outlet; and
    a second port coupled to the EVSE interface configured to electrically couple with a docking station when the first port is not in use receiving the power cable from the outlet.

9. The cable of claim 8, wherein the vehicle electrical connection interface is configured to support at least Level One charging.

10. The cable of claim 8, wherein the vehicle electrical connection interface is configured to support at least Level Two charging.

11. The cable of claim 8, wherein the power cable is configured for at least 120V service.

12. The cable of claim 11, wherein the power cable is configured for 240V service.

13. The cable of claim 8, wherein the power cable is configured with a NEMA connector.

14. The cable of claim 8, wherein the power cable includes a three-prong connector.

15. The cable of claim 8, wherein the EVSE interface includes at least one electrical equipment protection device.

16. A modular electrical vehicle supply equipment (EVSE) system comprising:
- a docking station configured to be physically coupled with a structure;
- an electrical vehicle supply equipment (EVSE) interface configured to be coupled with a portable electrical vehicle supply equipment (EVSE) cable and coupled with the docking station;
- a communications device coupled with the docking station and configured to send and receive information relating to use of the EVSE interface; and
- the portable EVSE cable having a first end with a vehicle connector interface and a second end couplable to the EVSE interface;
- wherein the EVSE interface comprises a first port configured to receive a power cable from an outlet; and
- wherein the EVSE interface further comprises a second port configured to electrically couple with the docking station when the first port is not in use receiving the power cable from the outlet.

17. The system of claim 16, wherein the system is configured to support Level One Charging.

18. The system of claim 16, wherein the system is configured to support Level Two Charging.

19. The system of claim 16, further comprising communications electronics coupled to the docking station and to provide communications related to controlling the modular EVSE system.

20. The system of claim 16, further comprising communications electronics coupled to the docking station and to provide communications related to monitoring the modular EVSE system.

* * * * *